(12) United States Patent
Coleman et al.

(10) Patent No.: US 7,469,973 B2
(45) Date of Patent: Dec. 30, 2008

(54) FABRICATED VEHICLE WHEEL HAVING A DISC WITH A PLURALITY OF STRENGTHENING RIBS

(75) Inventors: Alan Coleman, Southgate, MI (US); Michael Miller, Marshall, MI (US); Thomas Heck, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 128 days.

(21) Appl. No.: 11/365,972

(22) Filed: Mar. 1, 2006

(65) Prior Publication Data

US 2006/0197371 A1 Sep. 7, 2006

Related U.S. Application Data

(60) Provisional application No. 60/658,714, filed on Mar. 4, 2005.

(51) Int. Cl.
*B60B 3/12* (2006.01)

(52) U.S. Cl. .............................. 301/63.107; 301/35.626; 301/64.101

(58) Field of Classification Search ............ 301/63.101, 301/63.103, 63.106, 63.107, 63.108, 64.101, 301/35.626, 63.104
See application file for complete search history.

(56) References Cited

U.S. PATENT DOCUMENTS

| | | | | |
|---|---|---|---|---|
| 1,564,737 A | * | 12/1925 | Williams | 301/35.626 |
| 1,840,824 A | * | 1/1932 | Sinclair | 301/6.1 |
| 2,043,875 A | * | 6/1936 | Zerk | 301/35.59 |
| 2,141,457 A | * | 12/1938 | Ash | 301/35.59 |
| 2,453,512 A | * | 11/1948 | Jacobi | 301/35.626 |
| 2,670,995 A | * | 3/1954 | Lyon | 301/63.108 |
| 3,788,705 A | * | 1/1974 | Brainard et al. | 301/35.626 |
| 4,294,490 A | * | 10/1981 | Woelfel | 301/64.703 |
| 5,188,429 A | | 2/1993 | Heck et al. | |
| 5,360,261 A | | 11/1994 | Archibald et al. | |
| 5,421,642 A | | 6/1995 | Archibald | |
| 5,431,486 A | | 7/1995 | Kamahori | |
| 5,533,261 A | | 7/1996 | Kemmerer | |
| 5,544,945 A | * | 8/1996 | Daudi | 301/64.101 |
| 5,664,329 A | * | 9/1997 | Nickel | 29/894.324 |
| 6,473,967 B1 | * | 11/2002 | Coleman et al. | 29/894.322 |
| 6,520,596 B1 | | 2/2003 | Fitz et al. | |
| 6,629,736 B2 | * | 10/2003 | Coleman et al. | 301/63.102 |
| 7,059,685 B2 | * | 6/2006 | Kermelk et al. | 301/64.101 |
| 2004/0227392 A1 | | 11/2004 | Coleman et al. | |
| 2005/0006945 A1 | | 1/2005 | Alff et al. | |
| 2005/0017570 A1 | | 1/2005 | Alff et al. | |
| 2005/0017571 A1 | * | 1/2005 | McCorry et al. | 301/64.101 |
| 2007/0222279 A1 | * | 9/2007 | Csapo et al. | 301/64.101 |

\* cited by examiner

*Primary Examiner*—Russell D Stormer
(74) *Attorney, Agent, or Firm*—MacMillan, Sobanski & Todd, LLC (57) ABSTRACT

An improved fabricated wheel disc and a fabricated vehicle wheel including such a fabricated wheel disc and a fabricated wheel rim secured thereto by suitable methods. The fabricated wheel disc defines an axis and includes a wheel mounting surface portion, a plurality of spokes, an outer rim connecting flange, a plurality of lug bolt receiving holes and an outboard face. The wheel mounting surface includes at least one rib formed therein between at least one pair of the lug bolt receiving holes. The rib has a straight outer surface which extends at an angle with respect to the fabricated wheel disc axis throughout an entire length thereof.

11 Claims, 6 Drawing Sheets

FABRICATED VEHICLE WHEEL HAVING A DISC WITH A PLURALITY OF STRENGTHENING RIBS

CROSS-REFERENCE TO RELATED APPLICATIONS

This application claims the benefit of U.S. Provisional Application Ser. No. 60/658,714, filed Mar. 4, 2005, and is related to co-pending U.S. application Ser. No. 10/836,828, co-pending U.S. application Ser. No. 11/345,530, and co-pending U.S. application Ser. No. 11/344,621.

BACKGROUND OF THE INVENTION

This invention relates in general to vehicle wheels and in particular to an improved wheel disc for a fabricated vehicle wheel and a fabricated vehicle wheel including such a wheel disc.

A conventional fabricated vehicle wheel is typically of a two-piece construction and includes an inner disc and an outer "full" rim. The disc may be fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim may be fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

A full face fabricated wheel is distinguished from other types of fabricated wheels by having a one-piece wheel disc construction. In particular, the full face wheel includes a "full face" disc and a "partial" rim. The full face disc may be fabricated or otherwise formed from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

SUMMARY OF THE INVENTION

This invention relates to an improved fabricated wheel disc and a vehicle wheel including such a fabricated wheel disc and a fabricated wheel rim secured thereto by suitable methods. The fabricated wheel disc defines an axis and includes a wheel mounting surface portion, a plurality of spokes, an outer rim connecting flange, a plurality of lug bolt receiving holes and an outboard face. The wheel mounting surface includes at least one rib formed therein between at least one pair of the lug bolt receiving holes. The rib has a straight outer surface which extends at an angle with respect to the fabricated wheel disc axis throughout an entire length thereof.

Other advantages of this invention will become apparent to those skilled in the art from the following detailed description of the invention, when read in light of the accompanying drawings.

DETAILED DESCRIPTION OF THE INVENTION

Figure 1:
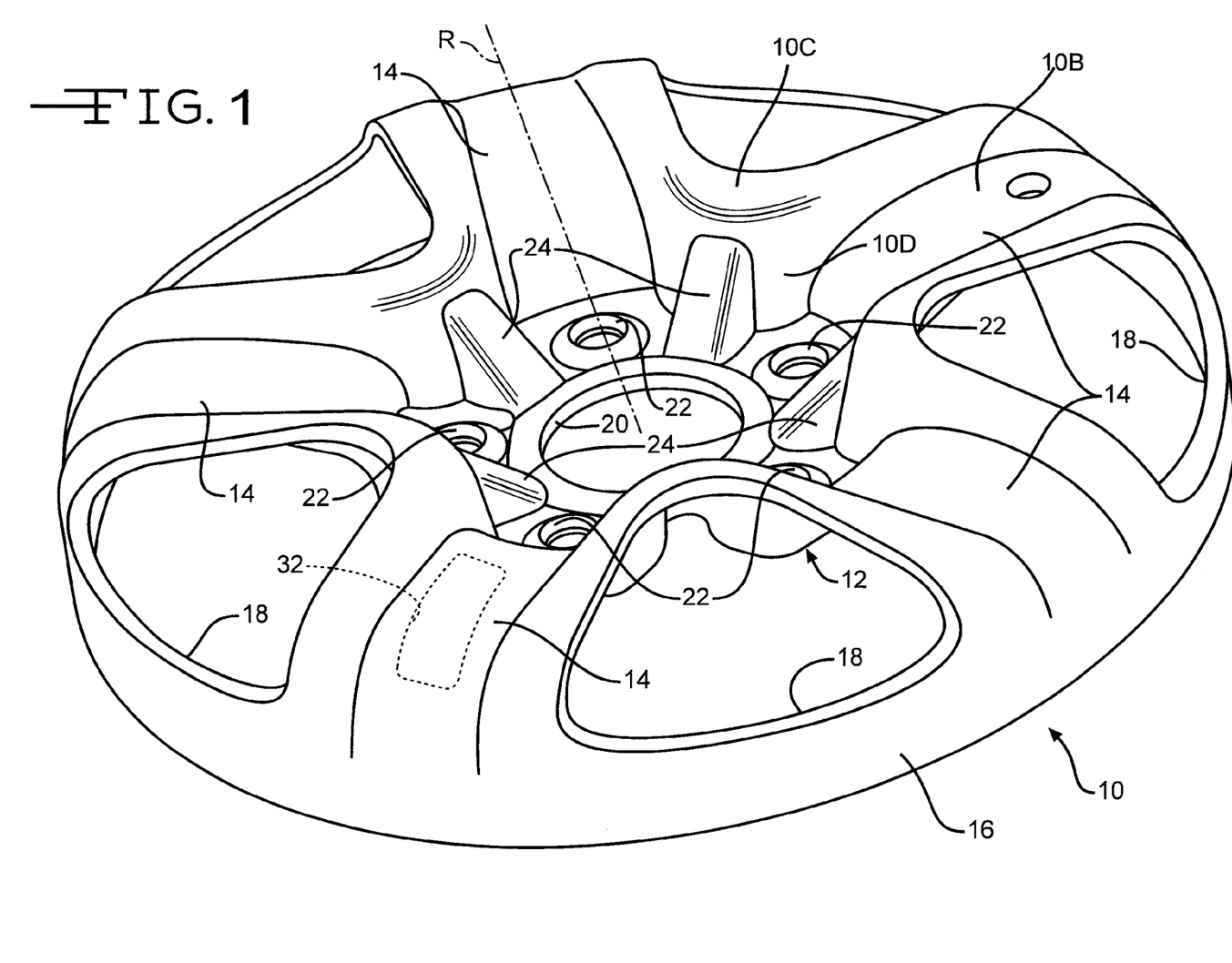
FIG. 1 is a perspective view of a first embodiment of a fabricated wheel disc in accordance with the present invention and adapted for use in producing a fabricated vehicle wheel constructed in accordance with the present invention.
Figure 2:
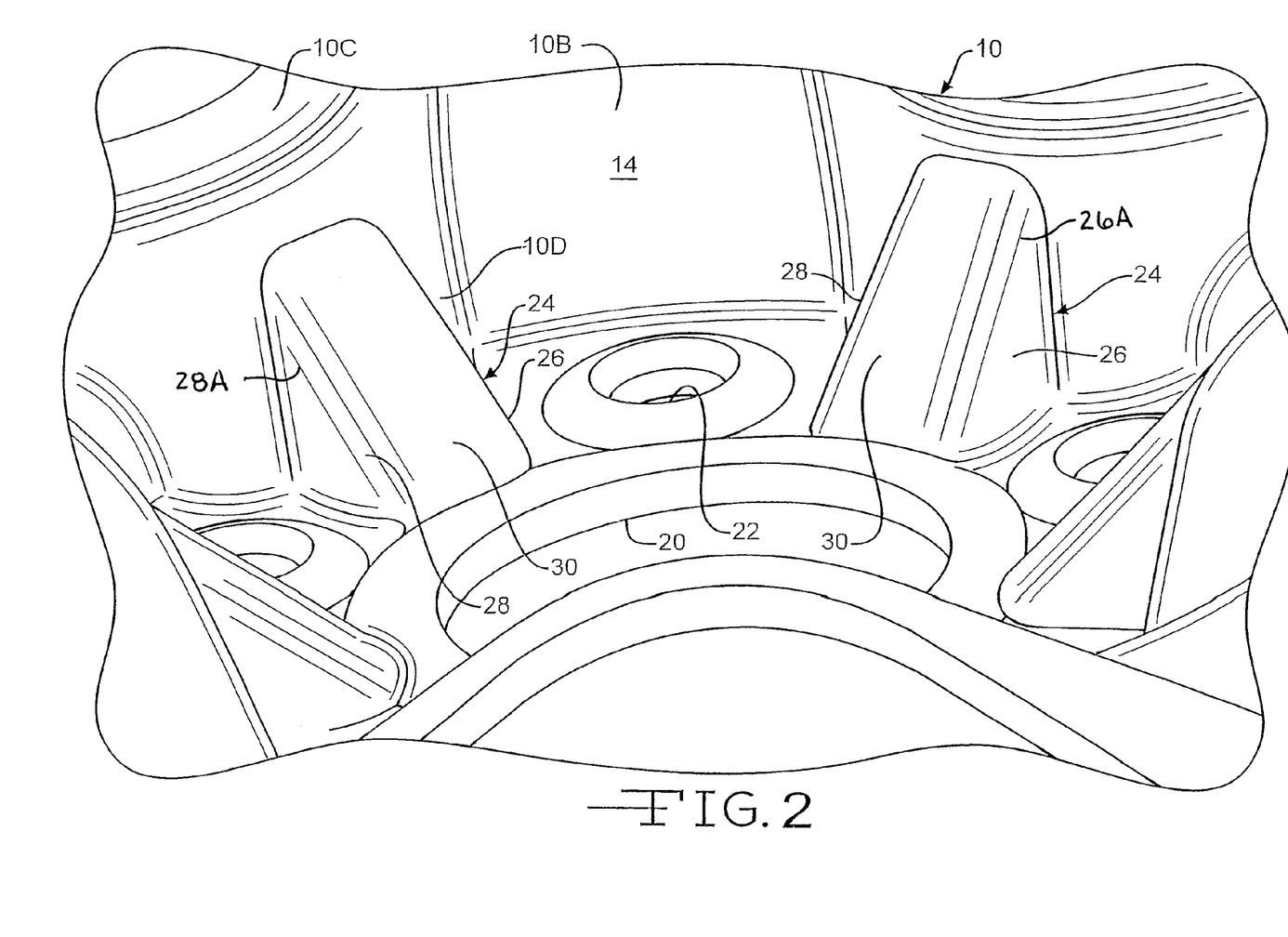
FIG. 2 is an enlarged view of a portion of the fabricated wheel disc shown in FIG. 1.
Figure 3:
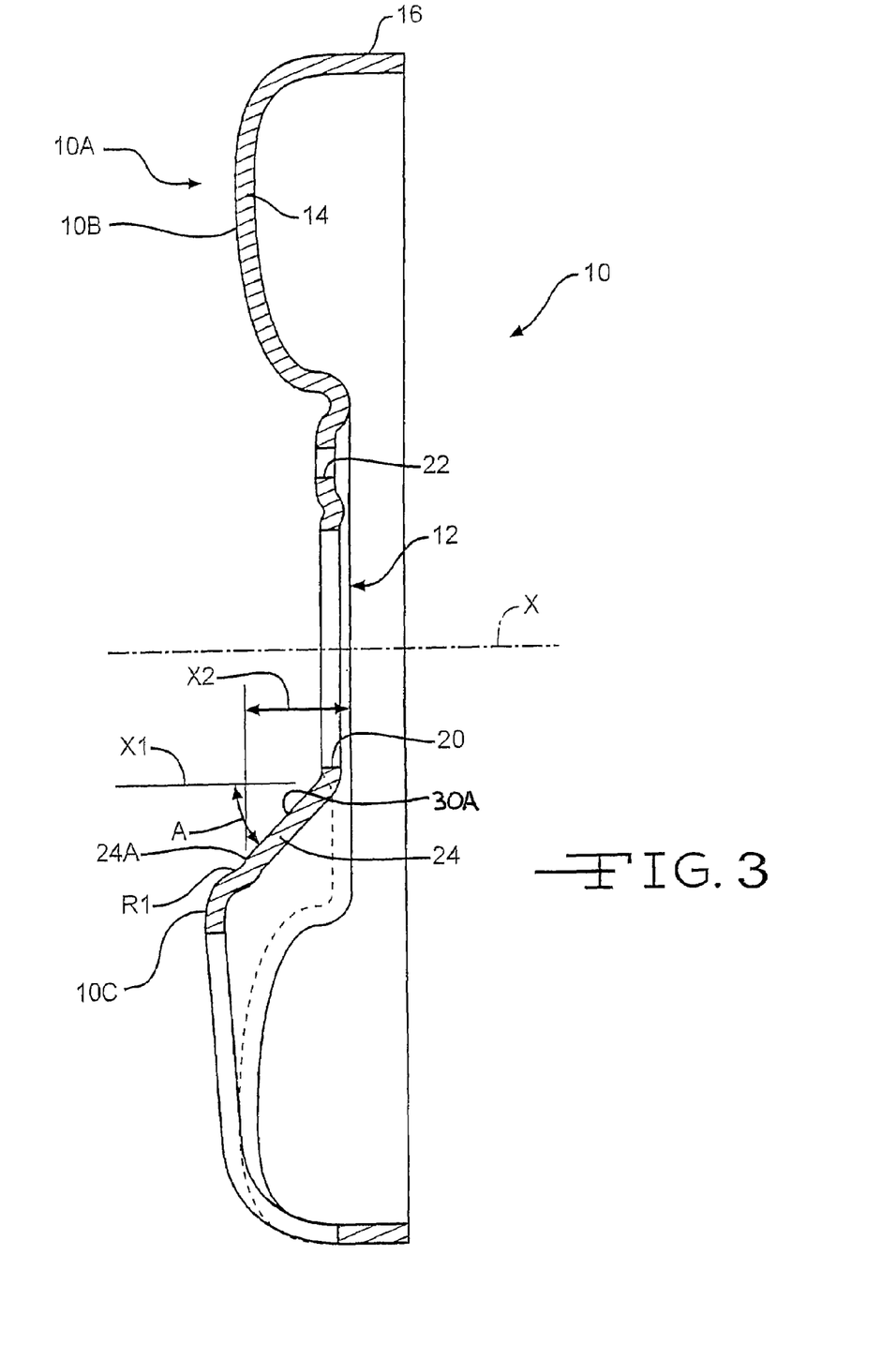
FIG. 3 is a sectional view of the fabricated wheel disc shown in FIG. 1.

Referring now to the drawings, there is illustrated in FIGS. 1-3 a first embodiment of a fabricated wheel disc, indicated generally at 10, in accordance with the present invention. The fabricated wheel disc 10 of this embodiment is illustrated as being adapted for use producing a fabricated "drop center" or "well attached" vehicle wheel, such as for example indicated generally at 30 in FIG. 6, or may be adapted for use in producing any other suitable types of fabricated vehicle wheels, if so desired. Although the present invention is illustrated and described in conjunction with the particular vehicle wheel construction disclosed herein, it will be appreciated that the invention can be used in conjunction with other types of fabricated vehicle wheel constructions, if so desired. For example, the fabricated wheel disc 10 of the present invention, as shown herein or with modifications thereto, can be used in connection with other types of fabricated vehicle wheels, such as for example in a "full face" type of vehicle wheel, such as shown in FIG. 5A of U.S. Pat. No. 5,533,261 to Kemmerer, in a "bead seat attached" type of vehicle wheel, such as shown for example in FIG. 4 of U.S. Pat. No. 5,188,429 to Heck et al., a "well attached" type of vehicle wheel, such as shown for example in FIG. 3 of U.S. Pat. No. 5,188,429 to Heck et al., a "bimetal" type of vehicle wheel construction including an aluminum disc and a steel rim, such as shown for example in U.S. Pat. No. 5,421,642 to Wei et al., and a "modular wheel" type of construction, such as shown for example in U.S. Pat. No. 5,360,261 to Archibald et al., the disclosures of each of these patents incorporated by reference in entirety herein.

As shown in the embodiment illustrated in FIGS. 1-3, the wheel disc 10 is fabricated or otherwise formed from a suitable material, such as for example, steel, aluminum or alloys thereof, magnesium, or titanium. The wheel disc 10 defines a wheel disc axis X (shown in FIG. 3), and includes a generally centrally located wheel mounting surface or portion, indicated generally at 12, a plurality of radially extending spokes 14, an outer band or rim connecting flange 16, and a plurality of vent windows 18 formed between each pair of adjacent spokes 14. In the illustrated embodiment, the wheel disc 10 includes five of such spokes 14 which are shown as being formed integral with the wheel mounting surface 12. Alternatively, the number and/or the construction of the spokes 14 can be other than illustrated if so desired. For example, the wheel disc 10 can include less than five spokes 14 or six or more spokes 14 and/or the spokes 14 can be formed separate from the wheel mounting surface 12 of the disc 10 and joined thereto by a suitable method. Also, each spoke 14 defines a radial line R (shown in FIG. 1), which intersects the wheel disc axis X and, as illustrated in this embodiment, each spoke 14 is preferably symmetrical with respect to the radial line R. The wheel disc 10 defines an outboard face, indicated generally at 10A in FIG. 3. In the illustrated embodiment, the outboard face 10A of the wheel disc 10 includes a spoke outboard face 10B and a window outboard face 10C. As shown in FIGS. 1-3, in this embodiment the spoke outboard face 10B is recessed or spaced inwardly relative to the window outboard face 10C. Alternatively, the construction of the outboard face 10A of the wheel disc 10 can be other than illustrated if so desired.

The wheel mounting surface 12 is provided with a centrally located pilot aperture 20 and a plurality of lug bolt receiving holes 22 circumferentially spaced around the pilot aperture 20. In the illustrated embodiment, the wheel mounting surface 12 includes five of such lug bolt receiving holes 22 which are preferably provided in the wheel mounting surface 12 symmetrical with respect to the radial line R and therefore, symmetrical with respect to each of the spokes 14. Alternatively, the number and/or the location of one or more of the lug bolt receiving holes 22 can be other than illustrated if so desired. The lug bolt receiving holes 22 are adapted to receive lug bolts (not shown) and nuts (not shown) for securing the wheel disc 10, and therefore the associated vehicle wheel, to an axle (not shown) of a vehicle.

The wheel mounting surface 12 further includes a plurality of "strengthening" ribs 24 provided therein. In the illustrated embodiment, a rib 24 is located between each pair of adjacent lug bolts receiving holes 22. each of the ribs 24 is defined by a raised or embossed area which extends outwardly away from or above the mounting surface 12 (i.e., upwardly in FIGS. 1 and 2 and to the left in FIG. 3)

As best shown in FIG. 2, each rib 24 has a generally triangular like shape and includes a pair of spaced apart side walls 26 and 28 and a top wall 30. In the illustrated embodiment, the side walls 26 and 28 extend generally parallel to one another and the top wall 30 extends generally perpendicular to the side walls 26 and 28; however, due to the forming process of the wheel disc 10, the transition areas 26A and 28A of the side walls 26 and 28, respectively, to the top wall 30 may be rounded or curved. Alternatively, one or more of the walls 26, 28 and 30 of the ribs 24 can be other than illustrated if so desired.

In the illustrated embodiment, the top wall 30 is preferably generally "flat" in the sense that the top wall 30 extends at a constant angle A with respect to an axis X1 which is parallel to the wheel disc axis X. In the illustrated embodiment, the top wall 30 defines a generally "straight" top wall outer surface 30A. To accomplish this in the illustrated embodiment, the angle A is preferably constant throughout the entire length of the rib 24 to define the generally straight top wall outer surface 30A throughout the entire length of the rib 24. The angle A may be in the range of from about 15 degrees to about 75 degrees. Preferably, the angle A may be in the range of from about 30 degrees to about 60 degrees. More preferably, as shown in the illustrated embodiment, the angle A is approximately 45 degrees.

In the illustrated embodiment, each rib 24 extends axially outwardly (to the left in FIG. 3), a predetermined height or distance X2 from the wheel mounting surface 12 toward the window outboard face 10C. As can be seen in the illustrated embodiment, the distance X2 is preferably selected so that an uppermost or outmost end 24A of the rib 24 is located below an adjacent surface of the window outboard face 10C of the wheel disc 10. As a result of this, the outermost end 24A of the rib 24 transitions into a generally axially extending surface 10D of the wheel disc 10 defined between the wheel mounting surface 12 and the window outboard face 10C of the disc 10. In the illustrated embodiment, the transition of the outermost end 24A of the rib 24 into the surface 10B of the disc 10 is preferably defined by a slight radius R1, as shown in FIG. 3.

In operation, the ribs 24 of the wheel disc 10 are operative to strengthen the wheel mounting surface 12 in order to prevent or reduce the wheel mounting surface 12 from flexing during vehicle operation thereby improving the fatigue life of the associated vehicle wheel. Alternatively, the spacing, location, number and/or configuration of one or more of the ribs 24 can be other than illustrated and described if so desired. For example, the top wall 30 can be other than illustrated and described, such as being generally flat or any other desired shape, and the side walls 26 and 28 could be oriented other than shown, such as for example, the side walls 26 and 28 could be non parallel to one another. Also, the angle A could be other than illustrated and described if so desired. For example, the angle A may not be constant throughout the entire length of the rib 24 but may be stepped or otherwise non-constant.

In the illustrated embodiment, the wheel disc 10 may also include one or more spoke openings formed in one or more of each of the spokes 14 (only one of such spoke openings illustrated in FIG. 1 in phantom by reference character 32). Alternatively, the number and/or the location of the spoke openings 32 can be other than illustrated if so desired.

Figure 4:
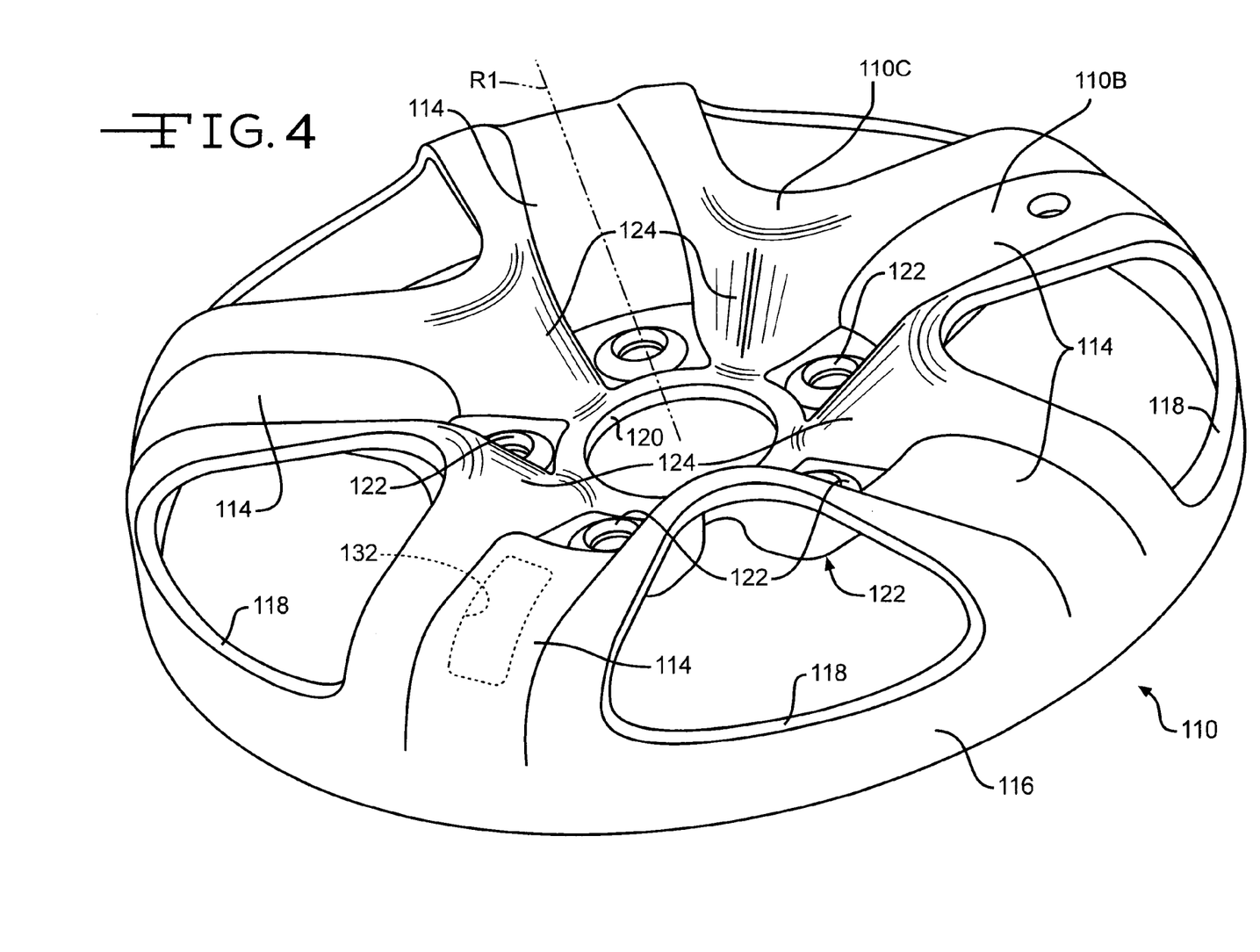
FIG. 4 is a perspective view of a portion of a second embodiment of a fabricated wheel disc in accordance with the present invention and adapted for use in producing a fabricated vehicle wheel constructed in accordance with the present invention.
Figure 5:
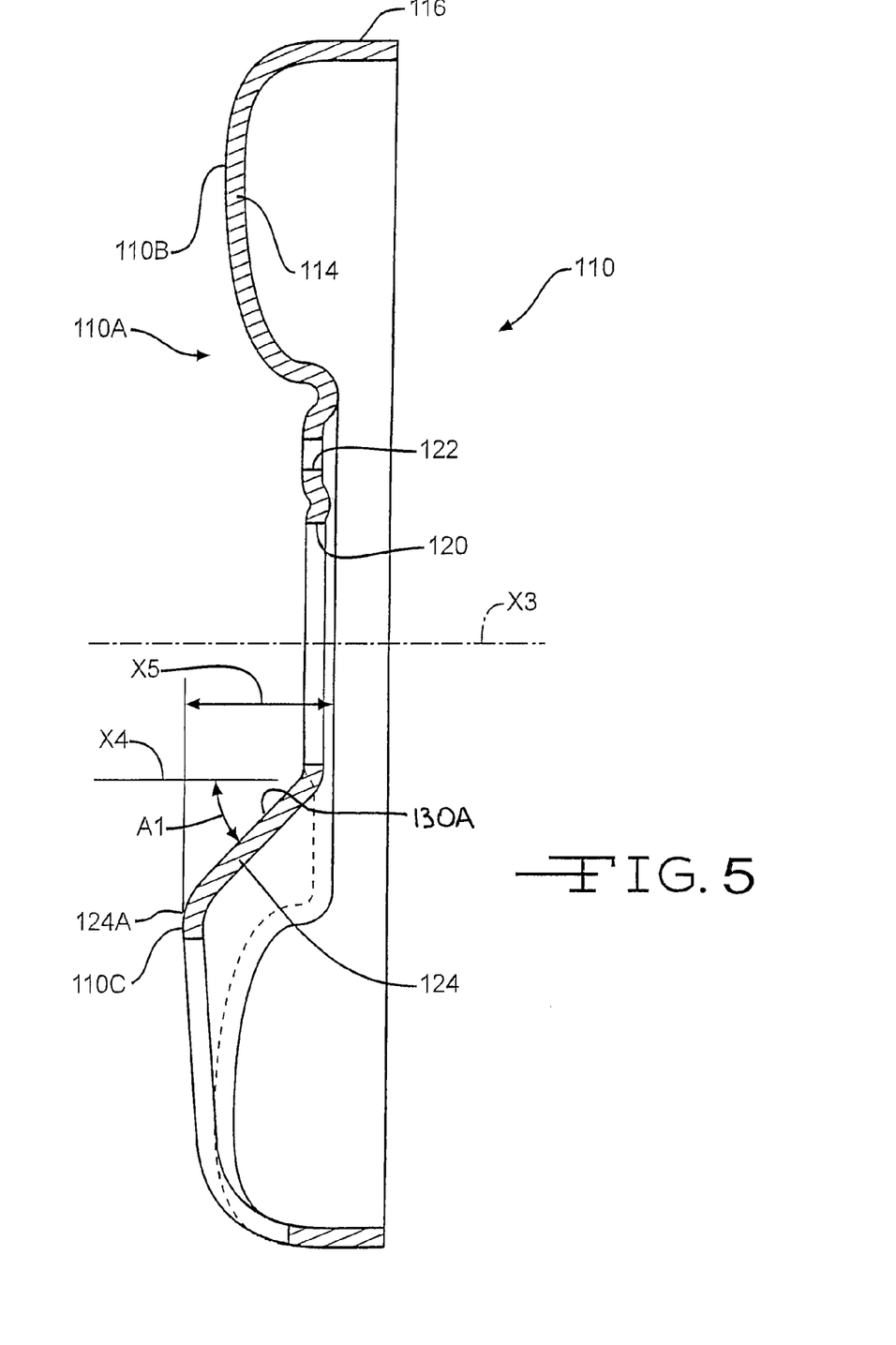
FIG. 5 is a sectional view of the fabricated wheel disc shown in FIG. 4.

Referring now FIGS. 4 and 5, there illustrated a second embodiment of a fabricated wheel disc, indicated generally at 110, in accordance with the present invention. The fabricated wheel disc 110 of this embodiment is illustrated as being adapted for use producing the fabricated drop center vehicle wheel 30 shown in FIG. 6, or may be adapted for use in producing any other suitable types of fabricated vehicle wheels, if so desired. Although the present invention is illustrated and described in conjunction with the particular vehicle wheel construction disclosed herein, it will be appreciated that the invention, as shown or with modifications thereto, can be used in conjunction with other types of vehicle wheel constructions if so desired. For example, the fabricated wheel disc 110 of the present invention can be used in other types of fabricated vehicle wheels, such as for example in a "full face" type of vehicle wheel, such as shown in FIG. 5A of U.S. Pat. No. 5,533,261 to Kemmerer, a "bead seat attached" type of vehicle wheel, such as shown for example in FIG. 4 of U.S. Pat. No. 5,188,429 to Heck et al., a "well attached" type of vehicle wheel, such as shown for example in FIG. 3 of U.S. Pat. No. 5,188,429 to Heck et al., a "bimetal" type of vehicle wheel construction including an aluminum disc and a steel rim, such as shown for example in U.S. Pat. No. 5,421,642 to Wei et al., and a "modular wheel" type of construction, such as shown for example in U.S. Pat. No. 5,360,261 to Archibald et al., the disclosures of each of these patents incorporated by reference in entirety herein.

As shown in the embodiment illustrated in FIGS. 4 and 5, the wheel disc 110 Is fabricated or otherwise formed from a suitable material, such as for example, steel, aluminum or alloys thereof, magnesium, or titanium. The wheel disc 110 defines a wheel disc axis X3 (shown in FIG. 5), and includes a generally centrally located wheel mounting surface or portion, indicated generally at 112, a plurality of radially extending spokes 114, an outer band or rim connecting flange 116 and a plurality of vent windows 118 formed between each pair of adjacent spokes 114. In the illustrated embodiment, the wheel disc 110 includes five of such spokes 114 which are shown as being formed integral with the wheel mounting surface 112. Alternatively, the number and/or the construction of the spokes 114 can be other than illustrated if so desired. For example, the wheel disc 110 can include less than five spokes 114 or six or more spokes 114 and/or the spokes 114 can be formed separate from the wheel mounting surface 112 of the disc 110 and joined thereto by a suitable method. Also, each spoke 114 defines a radial line R1 (shown in FIG. 4) which intersects the wheel disc axis X3 and, as illustrated in this embodiment, each spoke 114 is preferably symmetrical with respect to the radial line R1. The wheel disc 110 defines an outboard face, indicated generally at 110A in FIG. 5. In the illustrated embodiment, the outboard face 110A of the wheel disc 110 includes a spoke outboard face 110B and a window outboard face 110C. As shown in FIGS. 4-5, in this embodiment the spoke outboard face 110B is recessed or spaced inwardly relative to the window outboard face 110C. Alternatively, the construction of the outboard face 110A of the wheel disc 110 can be other than illustrated if so desired.

The wheel mounting surface 112 is provided with a centrally located pilot aperture 120 and a plurality of lug bolt receiving holes 122 circumferentially spaced around the pilot aperture 120. In the illustrated embodiment, the wheel mounting surface 112 includes five of such lug bolt receiving holes 122 which are preferably provided in the wheel mounting surface 112 symmetrical with respect to the radial line R1 and therefore, symmetrical with respect to each of the spokes 114. Alternatively, the number and/or the location of one or more of the lug bolt receiving holes 122 can be other than illustrated if so desired. The lug bolt receiving holes 122 are adapted to receive lug bolts (not shown) and nuts (not shown) for securing the wheel disc 110, and therefore the associated vehicle wheel, to an axle (not shown) of a vehicle.

The wheel mounting surface 112 further includes a plurality of ribs 124 provided therein. In the illustrated embodiment, a rib 124 is located between each pair of adjacent lug bolt receiving holes 122. Each of the ribs 124 is defined by a raised or embossed area which extends outwardly away from or above the mounting surface 112 (i.e., upwardly in FIG. 4 and to the left in FIG. 5).

As best shown in FIG. 5, each rib 124 is generally rounded or curved and extends at an angle A1 with respect to an axis X4 which is parallel to the wheel disc axis X3. In the illustrated embodiment, each rib 124 defines a generally straight outer surface 130A. to accomplish this in the illustrated embodiment, the angle A1 is preferably generally constant throughout the entire length of the rib 124 to define the generally straight outer surface 130A throughout the entire length of the rib 124.

The angle A1 may be in the range of from about 15 degrees to about 75 degrees. Preferably, the angle A1 may be in the range of from about 30 degrees to about 60 degrees. More preferably, as shown in the illustrated embodiment, the angle A1 is approximately 45 degrees.

In the illustrated embodiment, each rib 124 extends axially outwardly (to the left in FIG. 5), a predetermined height or distance X5 from the wheel mounting surface 112 to the window outboard face 110B of the disc 110 . As can be seen in the illustrated embodiment, the distance X5 is preferably selected so that an uppermost or outmost end 124A of the rib 124 is located generally tangent an adjacent surface of window outboard face 110B of the disc 110. As a result of this, the outermost end 124A of the rib 124 smoothly transitions into or blends with the adjacent surface of the window outboard face 110B of the disc 110.

In operation, the ribs 124 of the wheel disc 110 are operative to strengthen the wheel mounting surface 112 to prevent or reduce the wheel mounting surface 112 from flexing during vehicle operation thereby improving the fatigue life of the associated vehicle wheel. Alternatively, the spacing, location, number and/or configuration of one or more of the ribs 124 can be other than illustrated and described if so desired. Also, the angle A1 could be other than illustrated and described if so desired. For example, the angle A could not be constant throughout the entire length of the rib 24 but could be stepped or otherwise non-constant. In addition, the wheel disc 110 may also include one or more spoke openings (not shown) formed in one or more of each of the spokes 114 if so desired.

Figure 6:
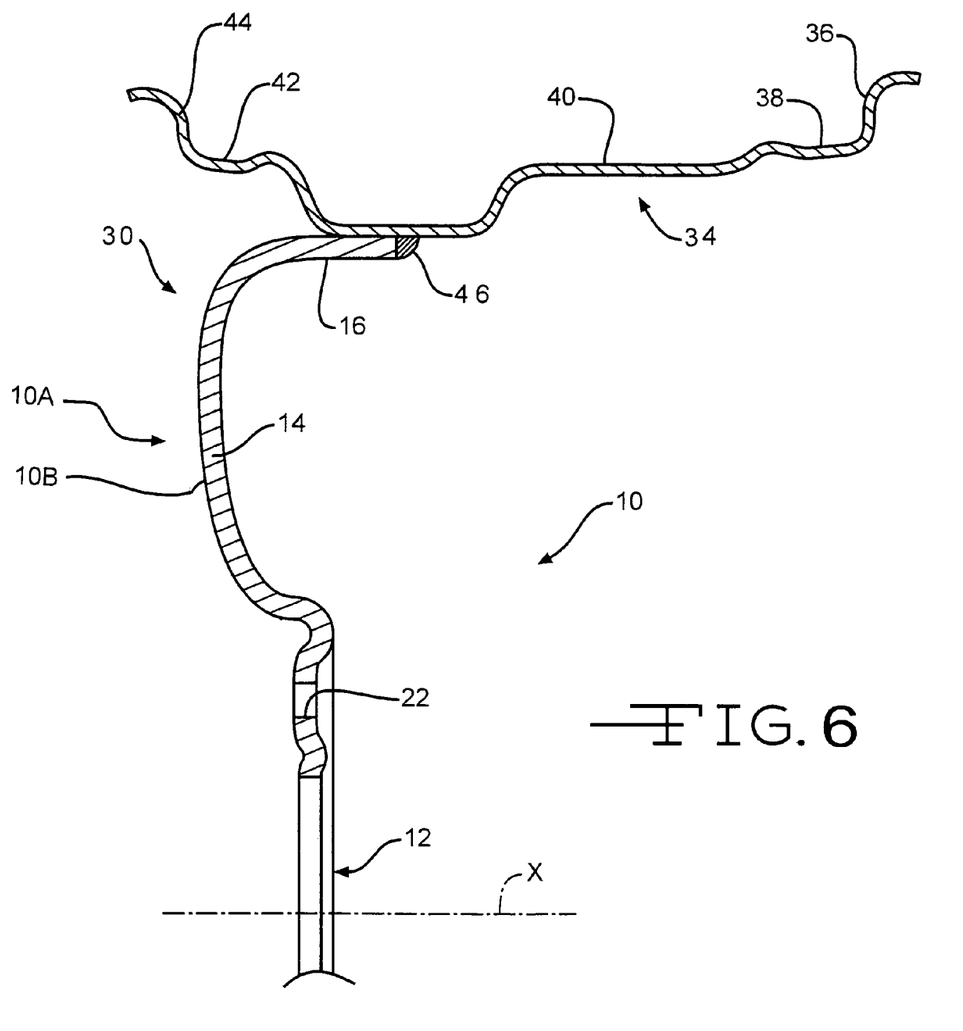
FIG. 6 is a sectional view of a portion of a fabricated vehicle wheel, including the fabricated wheel disc of the present invention, constructed in accordance with this invention.

As shown in FIG. 6, the wheel disc 10 (only wheel disc 10 illustrated in FIG. 6 though the same applies with respect to wheel disc 110), of the present invention may be secured to a wheel rim, indicated generally at 34, to produce a fabricated well attached vehicle wheel 30. The wheel disc may be secured to the wheel rim 34 by any suitable means, such as for example by welding, adhesives and/or riveting. In the illustrated embodiment, the wheel disc of the present invention is secured to the wheel rim 34 by a weld 46.

In the illustrated embodiment, the wheel rim 30 is fabricated or otherwise formed from a suitable material, such as for example, steel, aluminum or alloys thereof, magnesium, or titanium. As shown in FIG. 6, the wheel rim 30 includes an inboard tire bead seat retaining flange 36, an inboard tire bead seat 38, a generally axially extending well 40, an outboard tire bead seat 42, and an outboard tire bead seat retaining flange 44. Alternatively, the construction of the wheel rim 30 can be other than illustrated if so desired. For example, if the wheel disc 10, 110 of the present invention is constructed as a full face wheel disc adapted for use in a full face fabricated type of vehicle wheel, the wheel rim would have a different type of construction to accommodate such a full face wheel disc.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A fabricated wheel disc for use in producing a fabricated vehicle wheel comprising:
   a fabricated single piece wheel disc defining an axis and including a wheel mounting surface, a plurality of spokes, a window formed between each pair of adjacent spokes, a continuous outer rim connecting flange, a plurality of lug bolt receiving holes and an outboard face, said outboard face including a spoke outboard face and a window outboard face, said spoke outboard face being spaced inwardly relative to said window outboard face and said wheel mounting surface being spaced inwardly relative to said spoke outboard face;

wherein said wheel mounting surface includes at least one rib formed therein between at least one pair of said lug bolt receiving holes, said at least one rib having a top wall having a straight outer surface which extends at a generally constant angle with respect to said fabricated single piece wheel disc axis throughout an entire length of said at least one rib, wherein said straight outer surface of said top wall of said at least one rib extends at an angle in the range of from about to 15 degrees to about 75 degrees with respect to said wheel disc axis;

wherein said at least one rib extends axially outwardly a predetermined height from said wheel mounting surface toward said window outboard face, said predetermined height being selected so that said outmost end of said at least one rib is located below said adjacent surface of said window outboard face such that said outermost end transitions into a generally axially extending surface of said wheel disc defined between said wheel mounting surface and said window outboard face of said wheel disc, and wherein said at least one rib further includes a pair of spaced apart side walls which extend generally parallel to one another and said top wall extends generally perpendicular to said side walls.

2. The fabricated wheel disc of claim 1 wherein said wheel mounting surface includes a plurality of ribs formed therein, a respective one of said plurality of ribs located between each pair of said lug bolt receiving holes.

3. The fabricated wheel disc of claim 1 wherein said at least one rib is generally rounded.

4. The fabricated wheel disc of claim 1 wherein said straight outer surface of said at least one rib extends at an angle in the range of from about to 30 degrees to about 60 degrees with respect to said wheel disc axis.

5. The fabricated wheel disc of claim 1 wherein said fabricated wheel disc is formed from a material selected from the group consisting of steel, aluminum or alloys thereof, magnesium, or titanium.

6. A fabricated vehicle wheel comprising:

a fabricated wheel rim; and a fabricated single piece wheel disc secured to said wheel rim, said fabricated wheel disc defining an axis and including a wheel mounting surface, a plurality of spokes, a window formed between each pair of adjacent spokes, a continuous outer rim connecting flange, a plurality of lug bolt receiving holes and an outboard face, said outboard face including a spoke outboard face and a window outboard face, said spoke outboard face being spaced inwardly relative to said window outboard face and said wheel mounting surface being spaced inwardly relative to said spoke outboard face;

wherein said wheel mounting surface includes at least one rib formed therein between at least one pair of said lug bolt receiving holes, said at least one rib having a top wall having a straight outer surface which extends at a generally constant angle with respect to said fabricated single piece wheel disc axis throughout an entire length of said at least one rib, wherein said straight outer surface of said top wall of said at least one rib extends at an angle in the range of from about to 15 degrees to about 75 degrees with respect to said wheel disc axis, wherein said at least one rib extends axially outwardly a predetermined height from said wheel mounting surface toward said window outboard face, said predetermined height being selected so that said outmost end of said at least one rib is located below said adjacent surface of said window outboard face such that said outermost end transitions into a generally axially extending surface of said wheel disc defined between said wheel mounting surface and said window outboard face of said wheel disc, and wherein said at least one rib further includes a pair of spaced apart side walls which extend generally parallel to one another and said top wall extends generally perpendicular to said side walls.

7. The fabricated vehicle wheel of claim 6 wherein said wheel mounting surface includes a plurality of ribs formed therein, a respective one of said plurality of ribs located between each pair of said lug bolt receiving holes.

8. The fabricated vehicle wheel of claim 6 wherein said at least one rib is generally rounded.

9. The fabricated vehicle wheel of claim 6 wherein said fabricated wheel disc is formed from a material selected from the group consisting of steel, aluminum or alloys thereof, magnesium, or titanium.

10. The fabricated vehicle wheel of claim 6 wherein said fabricated vehicle wheel is selected from the group consisting of a fabricated well attached vehicle wheel, a fabricated bead seat attached vehicle wheel, a fabricated full face vehicle wheel, a fabricated bimetal vehicle wheel and a fabricated modular vehicle wheel.

11. The fabricated vehicle wheel of claim 6 wherein said straight outer surface of said at least one rib extends at an angle in the range of from about to 30 degrees to about 60 degrees with respect to said wheel disc axis.

* * * * *